United States Patent
Bellers

[11] Patent Number: 6,008,862
[45] Date of Patent: Dec. 28, 1999

[54] PERCEIVED COLOR TRANSIENT IMPROVEMENT

[75] Inventor: Erwin B. Bellers, Eindhoven, Netherlands

[73] Assignee: U.S. Philips Corporation, New York, N.Y.

[21] Appl. No.: 08/927,010

[22] Filed: Sep. 10, 1997

[30] Foreign Application Priority Data

Sep. 16, 1996 [EP] European Pat. Off. .............. 96202585

[51] Int. Cl.[6] ................................................. H04N 5/208
[52] U.S. Cl. ........................ 348/631; 348/625; 348/630; 348/606; 348/728; 382/266; 358/532
[58] Field of Search ..................................... 348/625, 630, 348/631, 728, 909, 612, 607, 252, 627, 606; 382/254, 266, 162; 358/532, 447; H04N 5/208

[56] References Cited

U.S. PATENT DOCUMENTS

| | | | |
|---|---|---|---|
| 4,316,215 | 2/1982 | Yasumoto et al. ...................... | 348/628 |
| 4,331,971 | 5/1982 | Bretl ....................................... | 348/628 |
| 4,376,952 | 3/1983 | Troiano .................................. | 348/627 |
| 4,430,665 | 2/1984 | Cochran ................................. | 348/627 |
| 4,739,395 | 4/1988 | Johanndeiter et al. ................ | 348/628 |
| 4,847,681 | 7/1989 | Faroudja et al. ....................... | 348/625 |
| 5,012,331 | 4/1991 | Schuster ................................. | 348/253 |
| 5,038,206 | 8/1991 | Ubukata ................................. | 348/631 |
| 5,047,856 | 9/1991 | Miller ..................................... | 348/625 |
| 5,053,865 | 10/1991 | Ubukata ................................ | 348/631 |
| 5,231,677 | 7/1993 | Mita et al. ............................. | 382/266 |
| 5,237,402 | 8/1993 | Deshon et al. ........................ | 358/520 |
| 5,237,414 | 8/1993 | Faroudja ................................ | 348/606 |
| 5,418,574 | 5/1995 | Miyabata et al. ..................... | 348/625 |
| 5,621,868 | 4/1997 | Mizutani et al. ..................... | 345/431 |
| 5,936,682 | 8/1999 | Thomas et al. ....................... | 348/625 |

FOREIGN PATENT DOCUMENTS

| | | | |
|---|---|---|---|
| 0325427A2 | 1/1989 | European Pat. Off. ......... | H04N 5/14 |
| 0325427-A2 | 7/1989 | European Pat. Off. ......... | H04N 5/14 |
| 0621732A2 | 4/1994 | European Pat. Off. ......... | H04N 9/64 |

*Primary Examiner*—Michael H. Lee
*Assistant Examiner*—Jean W. Désir
*Attorney, Agent, or Firm*—Edward W. Goodman

[57] ABSTRACT

In a method of obtaining an improved perceived color transient, an artificial transient signal is inserted (50) into a luminance signal (Yin) when it is detected (10, 20, 30) that there is an edge in a chrominance signal (Cin) in the absence of an edge in the luminance signal (Yin).

4 Claims, 1 Drawing Sheet

PERCEIVED COLOR TRANSIENT IMPROVEMENT

BACKGROUND OF THE INVENTION

1. Field of the Invention

The invention relates to a method and apparatus for obtaining a perceived color transient improvement, and to a television receiver incorporating such an apparatus.

2. Description of the Related Art

U.S. Pat. No. 5,012,331 discloses a video enhancement apparatus for a graphics encoder which extracts "sine-squared" (haversine) pulses representing absolute values for the derivatives of R-Y and B-Y color-difference "sine-squared" transitions; multiplies by offset, sign-inverted luminance, and adds the luminance-weighted "sine-squared" pulses to the composite video as color enhancement signals which exceed the NTSC-legal chroma bandwidth but are within the NTSC-legal luminance bandwidth. The pulses augment luminance during chroma transitions, restoring luminance contributions from chrominance which are lost when chroma subcarrier rise times and bandwidth are limited by NTSC broadcast requirements. This is desirable because NTSC-defined colors with a low luminance (Y) component derive relatively more of their visible brightness from chrominance components. Chrominance subcarrier rise time limiting therefore visibly darkens color transitions with low luminance more than color transitions involving relatively high luminance. The resulting augmentation of luminance during color transitions sharpens the apparent resolution on television receiver or monitor cathode ray tubes without extending chrominance bandwidth requirements necessary to prevent chrominance-luminance crosstalk.

European Patent Application EP-A-0,621,732, corresponding to U.S Pat. Nos. 5,663,769 and 5,621,480, discloses an image correction circuit having a variable gain amplifier for amplifying an extracted high-frequency component of a luminance signal in such a manner that the gain thereof is increased when detected color density is high, and is reduced when the detected color density is low, and a slice circuit for slicing the outputted amplitude of the variable gain amplifier at a prescribed value, wherein a corrected luminance signal is obtained by combining an image quality correction signal outputted from the slice circuit with the luminance signal to be corrected.

SUMMARY OF THE INVENTION

It is, inter alia, an object of the invention to provide improved techniques for obtaining an improved perceived color transient. To this end, a first aspect of the invention provides a method of obtaining an improved perceived color transient, the method comprising the steps of detecting whether there is an edge in an input chrominance signal (Cin) in the absence of an edge in an input luminance signal (Yin), to generate a detection signal; generating a transient signal in response to said detection signal; and inserting said transient signal into said input luminance signal (Yin) to obtain an output luminance signal (Yout). A second aspect of the invention provides an apparatus for obtaining an improved perceived color transient, the apparatus comprising means for detecting whether there is an edge in an input chrominance signal (Cin) in the absence of an edge in an input luminance signal (Yin), to generate a detection signal; means for generating a transient signal in response to said detection signal; and means for inserting said transient signal into said input luminance signal (Yin) to obtain an output luminance signal (Yout). A third aspect of the invention provides a television receiver incorporating such an apparatus.

In a method of obtaining an improved perceived color transient in accordance with a major aspect of the present invention, an artificial transient signal is inserted into a luminance signal when there is an edge in a chrominance signal in the absence of an edge in the luminance signal.

These and other aspects of the invention will be apparent from and elucidated with reference to the embodiments described hereinafter.

DESCRIPTION OF THE PREFERRED EMBODIMENTS

Figure 1:
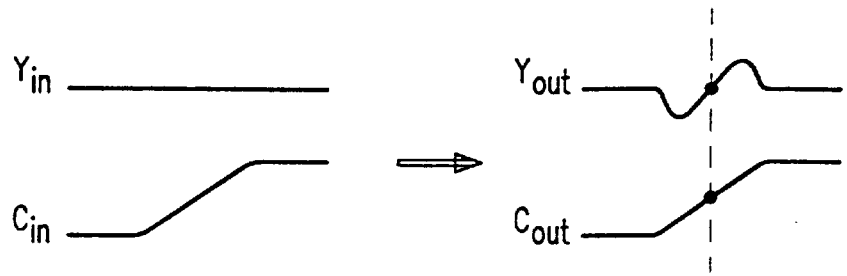
FIG. 1 illustrates the principles according to which a major aspect of the invention operates.

At the left-hand side of FIG. 1, an input luminance signal Yin and an input chrominance signal Cin are shown. The input luminance signal Yin has no transient, while the input chrominance signal Cin has an increase in its amplitude. At the right-hand side of FIG. 1, an output luminance signal Yout and an output chrominance signal Cout are shown. The output luminance signal Yout shows a change the center of which coincides with the center of the transient in the input chrominance signal Cin. The output chrominance signal Cout is identical to the input chrominance signal Cin.

The invention as illustrated in FIG. 1 is based on the following recognitions. Standard color transient improvement steepens an edge in the chrominance signal. While the general impression is a somewhat sharper image, the added value is relatively small.

It is known that luminance edge enhancement contributes more to a sharper image than chrominance edge enhancement. Consequently, if luminance edges and chrominance edges are located on about the same spot, luminance edge enhancement 'overrules' the effect of chrominance edge enhancement. So, the effect of chrominance edge enhancement on positions where luminance edge enhancement is applied is negligible.

From these observations, it is concluded that chrominance edge enhancement is only meaningful if such an edge does not go along with a luminance edge. And if a chrominance edge does not go along with a luminance edge, the perception of that chrominance edge can significantly be improved by introducing an artificial transition in the luminance signal at that location. While it is, of course, not forbidden to also enhance the chrominance signal and/or to sharpen any existing transients in the luminance signal in dependence on the chrominance signal substantially as known from the prior art, the innovation brought by the present invention is that in the absence of a transient in the input luminance signal Yin, an improved color transient perception is obtained by introducing a transient in the output luminance signal Yout at the location of a transient in the input chrominance signal Cin, without affecting the chrominance signal itself. While FIG. 1 shows just one possible waveform of an artificial peaked signal inserted in the output luminance signal, other waveforms can readily be conceived by those skilled in the art.

Figure 2:
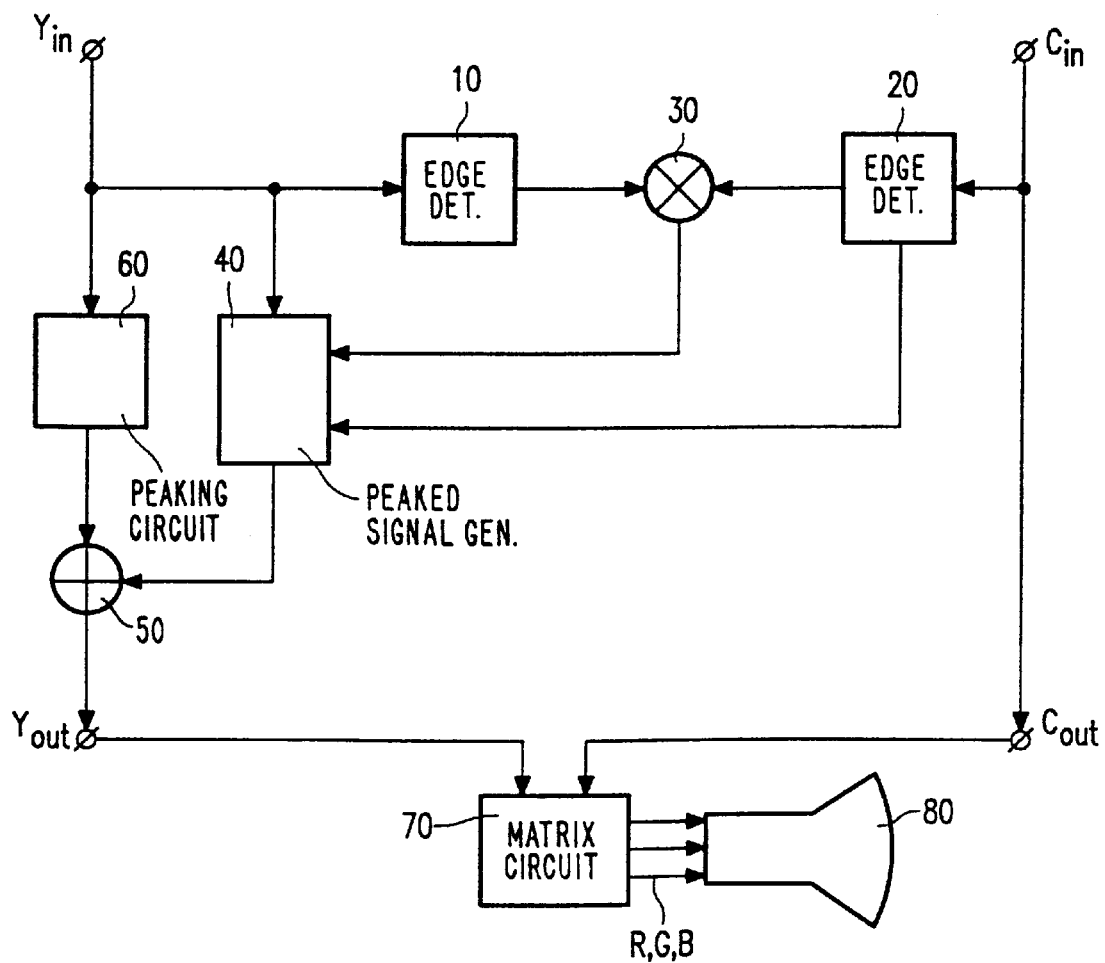
FIG. 2 shows a block diagram of an embodiment of a television receiver in accordance with the present invention.

FIG. 2 shows a block diagram of an embodiment of a television receiver in accordance with the present invention.

The input luminance signal Yin is applied to a luminance edge detector 10 which supplies a logical ONE signal only if there is no edge in the input luminance signal Yin. The input chrominance signal Cin is applied to a chrominance edge detector 20 which supplies a logical ONE signal only if there is an edge in the input chrominance signal Cin. A multiplier 30 multiplies the logical signals from the edge detectors 10, 20 and furnishes a logical control signal (only ONE if there is an edge in the input chrominance signal Cin but no edge in the input luminance signal Yin) to artificial peaked signal generator 40. Preferably, the chrominance edge detector 20 furnishes edge parameters like width and steepness of the edge to the artificial peaked signal generator 40. An output signal from the generator 40 is applied to an adder 50, which also received a peaked luminance signal from an optional luminance peaking circuit 60 to which the input luminance signal Yin is applied. The adder 50 supplies the output luminance signal Yout, while in the present embodiment, the output chrominance signal Cout is identical to the input chrominance signal Cin.

The output luminance signal Yout and the output chrominance signal Cout are applied to a matrix circuit 70 which furnishes RGB signals to a display unit 80.

While in the embodiment of FIG. 2, a single chrominance signal is used, both demodulated chrominance signals U and V (not shown) may be used. The chrominance edge detector 20 may furnish a logical ONE output signal only if there is an edge in both demodulated chrominance signals U and V, or in an alternative embodiment, already if there is an edge in only one of the demodulated chrominance signals U and V.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The invention can be implemented by means of hardware comprising several distinct elements, and by means of a suitably programmed computer.

I claim:

1. A method of obtaining an improved perceived color transient, the method comprising the steps:

detecting whether there is an edge in an input chrominance signal (Cin) in the absence of an edge in an input luminance signal (Yin), to generate a detection signal;

generating a transient signal in response to said detection signal; and inserting said transient signal into said input luminance signal (Yin) to obtain an output luminance signal (Yout).

2. A method as claimed in claim 1, wherein said inserting step includes the further steps:

subjecting said input luminance signal (Yin) to an enhancement operation to obtain an enhanced luminance signal; and inserting said transient signal into said enhanced luminance signal to obtain said output luminance signal (Yout).

3. An apparatus for obtaining an improved perceived color transient, the apparatus comprising:

means for detecting whether there is an edge in an input chrominance signal (Cin) in the absence of an edge in an input luminance signal (Yin), to generate a detection signal;

means for generating a transient signal in response to said detection signal; and means for inserting said transient signal into said input luminance signal (Yin) to obtain an output luminance signal (Yout).

4. A television receiver, comprising:

an apparatus for obtaining an improved perceived color transient, said apparatus comprising:

means for detecting whether there is an edge in an input chrominance signal (Cin) in the absence of an edge in an input luminance signal (Yin), to generate a detection signal;

means for generating a transient signal in response to said detection signal; and means for inserting said transient signal into said input luminance signal (Yin) to obtain an output luminance signal (Yout);

means coupled to said apparatus for obtaining color signals (R, G, B) from said input chrominance signal and said output luminance signal; and means for displaying said color signals (R, G, B).

* * * * *